June 11, 1957  J. B. PORTER  2,795,072
AUTOMATIC FISHING DEVICE
Filed Feb. 2, 1956  2 Sheets-Sheet 1
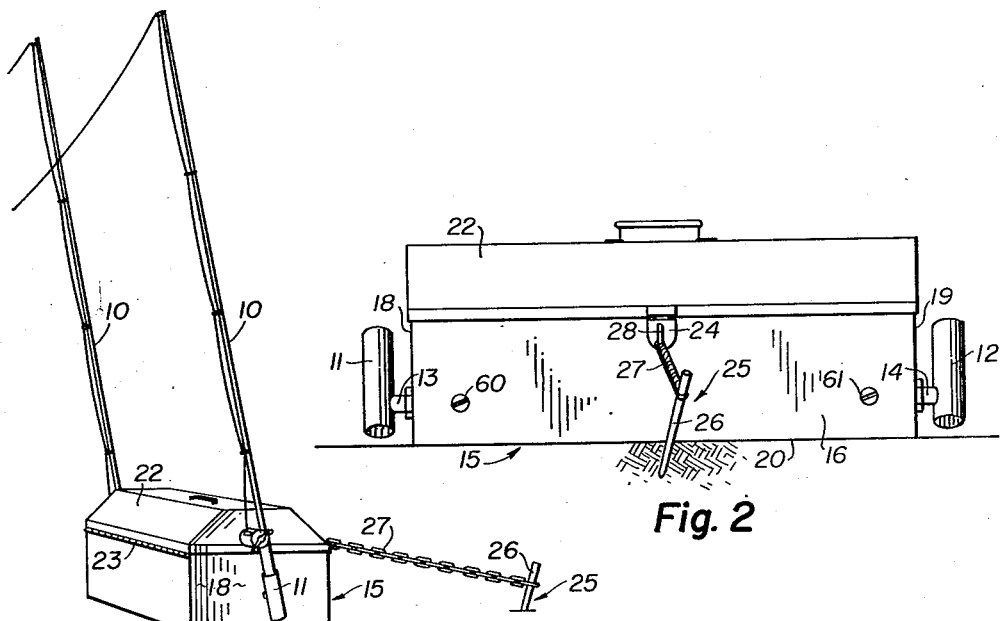
Fig. 1
Fig. 2
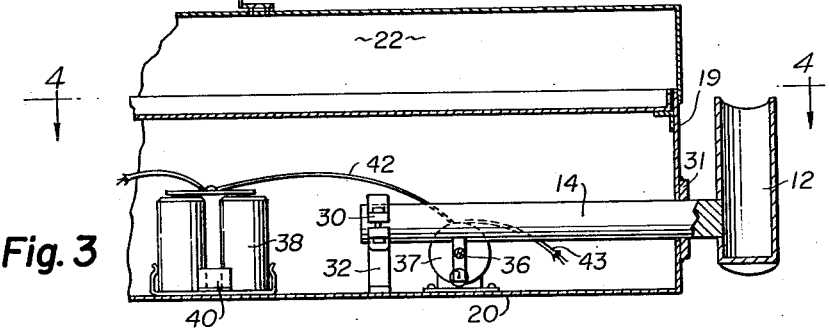
Fig. 3
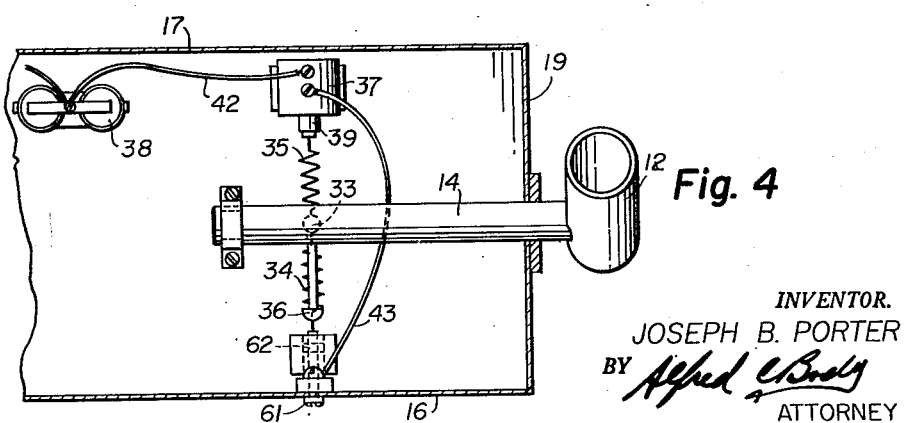
Fig. 4
INVENTOR.
JOSEPH B. PORTER
BY *Alfred C. Body*
ATTORNEY June 11, 1957  J. B. PORTER  2,795,072
AUTOMATIC FISHING DEVICE
Filed Feb. 2, 1956  2 Sheets-Sheet 2

INVENTOR.
JOSEPH B. PORTER
BY *Alfred C. Bell*
ATTORNEY

United States Patent Office 2,795,072
Patented June 11, 1957

2,795,072

AUTOMATIC FISHING DEVICE

Joseph B. Porter, Cleveland, Ohio

Application February 2, 1956, Serial No. 563,030

6 Claims. (Cl. 43—16)

This invention relates to fishing devices and more specifically to a device for supporting a fishing pole and pulling the pole when a fish bites on the line and continuing to pull the pole so long as the fish pulls against it.

In the past many devices have been devised to support fishing poles and swing them upwardly and rearwardly when a fish bites. These devices generally comprise a supporting bracket which is pivotally mounted on a base structure. A spring device is provided which is loaded and set when the fishing line is extended. A triggering device is provided which releases the spring when a fish pulls on the line. The spring then causes the pole to pivot upwardly and rearwardly to pull the line in and hook the fish. Once the triggering device has been released the entire action of the mechanism is spent.

The present invention contemplates an advance over the prior art by providing a mechanism which will not only pull the line when the fish first bites but will continue to pull the line in an oscillating-like fashion so long as the fish is on the line and resisting.

It is, therefore, a principal object of this invention to provide a fishing pole supporting device which when a fish bites will both jerk the line inwardly to hook the fish and additionally will continue to jerk the line so long as the fish is on the line and active.

A further object of this invention is to provide a combination fishing tackle box and fishing pole supporting device to provide a convenient complete unitary fishing apparatus.

A further object of this invention is to provide a supplemental source of energy to jerk the pole back with a force greater than the force with which the fish pulls it outwardly.

A further object of this invention is to provide a fishing pole supporting device which will give a sudden jerk to the fish line and hook when the fish bites the bait, but which also has a cushioned jerk to prevent pulling the hook into and through the fish's mouth.

A further and more special object of this invention is to provide a solenoid and battery as a source of supplemental energy to activate a fishing pole supporting device.

An additional specialized object of this invention is to provide an adjustment to permit the cushioning device, which may take the form of a pair of springs, to be adjusted to meet the conditions under which the device is being used.

Yet another specialized object of this invention is to provide a simple, inexpensive anchor means to fix the fishing pole supporting device and prevent its being pulled out of position or into the water by the fish.

Yet another specialized object of this invention is to provide the combination of a fishing tackle box and a pair of fishing pole supporting devices on either side of the box to permit the operator to simultaneously fish with a pair of fishing poles.

Yet another specialized object of this invention is to provide a manually operated switch to override the automatic triggering mechanism and permit the operator to activate the mechanism by remote control. Through this construction it is possible to permit the fisherman to use a plurality of fishing poles at one time and to hook even the smallest fish which are too small to activate the automatic mechanism.

In accordance with the present invention there is provided in combination means for supporting the butt end of a fishing pole pivoted about an axis at an angle to the length of the rod, and means responsive to a pull in one direction on the rod to repetitively jerk the rod in the opposite direction as long as the pull is maintained.

Further, in accordance with the invention, reaction means are provided to jerk the pole in one direction in response to a pull in the other direction, including a resilient cushioning device such as a spring to prevent a jerk which is too abrupt and may pull the hook from the fish's mouth.

Further, in accordance with the invention, the reaction means may also include a second spring to oppose the first spring and hold the device in a neutral position when no pull is exerted on the pole. This second spring may include adjustment means to permit the reaction means to be adjusted to meet existing conditions.

Further, in accordance with the invention, the reaction means includes pulling means. The pulling means is activated by a source of energy to permit a fishing pole to be repetitively jerked back with greater force than it is pulled out. Preferably, this pulling means is automatically activated in response to a pull on the fishing pole.

Further, in accordance with the invention, manual means is provided to permit the selective activation of the pulling means by the operator of the device.

Further, the invention contemplates a combination device in which a shaft is journalled in a fishing tackle box. The shaft has a pole supporting device connected to it. The shaft is also connected to a reacting mechanism which will cause a counterrotation of the shaft when a fish pulls on a line and causes a rotation of the shaft. Thus, a complete fishing apparatus including a remotely controlled or an automatically controlled fish catching device and a fishing tackle box are provided in a single, individual unit.

The invention also contemplates the use of an anchor device to secure such a combination fishing tackle box and pole supporting device in a desired position.

Other objects and a fuller understanding of the invention may be had by referring to the following specification and claims, taken in conjunction with the accompanying drawings, in which:

Figure 1 is a perspective view showing a fishing tackle box having a pair of fishing pole supporting devices mounted therein and a pair of fishing poles supported by those devices;

Figure 2 is a front eelvational view of the device of Figure 1 on an enlarged scale;

Figure 3 is a fragmentary sectional view on an enlarged scale with respect to Figure 2 showing one of the fishing pole supporting devices, the shaft upon which it is mounted, the mechanism for activating the shaft, and an end of a fishing tackle box supporting such mechanism;

Figure 4 is a foreshortened sectional view, in the scale of Figure 3, showing a top plan view of the fishing pole supporting device and activating mechanism and a sectional view of the fishing tackle box containing such mechanism;

Figure 5:
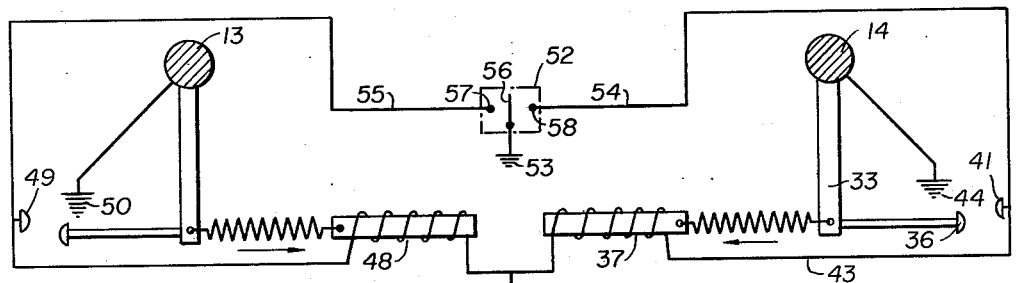
Figure 6:
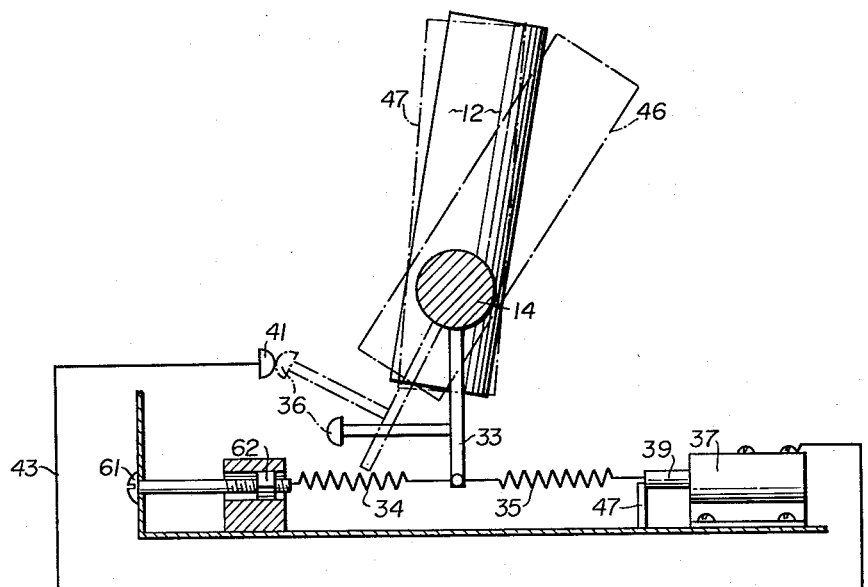

Figure 5 is a diagrammatic view showing the activating mechanism for the fishing pole supporting devices; and, Figure 6 is a side elevational view, partly diagrammatic, and partly in section, showing one of the fishing pole supporting devices and showing in phantom lines the various positions of said device, and showing a side plan view of the activation mechanism for the fishing pole supporting device.

Referring to the drawings, and to Figures 1 and 2 in particular, a pair of fishing poles 10 are carried by fishing pole supports 11, 12 here shown as a pair of cylindrically contoured horns which receive the butt ends of the fishing poles. Other fishing pole supports are, of course, contemplated, and within the scope of the invention. A clamp-like device for support of the pistol grip fishing pole, for example, may readily be substituted for the horns which are shown.

The pole supports 11, 12 are fixed to shafts 13, 14. The shafts 13, 14 are carried by a tackle box which is shown generally at 15. The box 15 has a front wall 16, a back wall 17, end walls 18, 19 and a bottom wall 20. A cover 22 is hinged at 23 (Figure 1) to the back wall 17 to form a closed container. A lock 24 is provided to hold the cover in a closed position.

An anchor shown generally at 25 is provided to hold the box in a stable position and to prevent its being pulled by a fish. The anchor may simply take the form of a ground penetrating pin 26 which is connected to a chain 27. The chain in turn is connected to a ring 28 which forms part of the lock.

Referring to Figures 3 and 4, one of the fishing pole supporting devices is there shown. Since the two devices are identical in form, a single device is here shown for clarity of illustration. Further, though the preferred embodiment has a pair of fishing pole supporting devices, a unit having any number of pole supporting devices is well within the scope of the invention.

The shaft 14 is journalled in a suitable pair of bearings which are indicated at 30, 31. The bearing 31 is fixed to the end wall 19 of the box and the bearing 30 is carried by a suitable bracket 32. The shaft 14 has a reduced diameter portion to receive the bearing 30. Thus, bearing 30 serves as a thrust bearing to prevent axial movement of the shaft. The bracket 32 is connected to the bottom wall 20 of the box. The shaft 14 has a laterally projecting lever 33 connected to it. The lever has a cushioning spring 34 and a solenoid spring 35 connected to it. The lever 33 also carries a movable contact point 36. While the preferred construction contemplates the single disclosed lever 33, two or three levers may, of course, be employed. Alternately, the springs 34, 35 and the contact point 36 may be connected directly to the shaft.

A solenoid 37 is fixed to the box 15 preferably being fixed to bottom wall 20. The solenoid 37 has a core 39 which is connected to the solenoid spring 35 and thence to the lever 33. The solenoid serves as a pulling means to jerk the pole rearwardly by pulling the solenoid spring 35. The core 39 may rest against a stop 47 (see Fig. 6). The stop 47 prevents the core 39 from being pulled out of the solenoid by the solenoid spring 35.

A suitable battery or batteries 38 are carried in a supporting bracket 40. The batteries 38 provide a suitable source of electrical potential for activation of the solenoid 37, as will subsequently be described in more detail.

A fixed contact point 41 is carried by the box 15, which, as is apparent, serves as a frame for the entire pole supporting device. Preferably, the fixed contact point 41 is adjustable. Also, preferably, the moving contact point 36 has a curved contact surface. Thus, though some amount of bending and wear may be experienced, a line contact will be formed between the contact points 36, 41 in various positions of adjustment.

The solenoid 37 is connected to the battery 38 by conductor 42. The fixed contact 41 is connected to the solenoid 37 through conductor 43 (see Fig. 4). The movable contact point 36 is connected to ground as indicated at 44 and the battery is also connected to ground as indicated at 45 in Fig. 5.

The shaft 14 is normally held in a neutral position by the opposing action of the springs 34, 35. When a fish bites the pole is pulled outwardly moving the pole support 12. The pole support 12 rotates on the shaft 14 to a position shown in phantom in Figure 6 at 46. This action is against the tensioning of the spring 35. When the pole support 12 is in the position indicated at 46 the contacts 36, 41 are in contact. The closed contacts serve as a means to activate the reaction mechanism by closing the circuit formed by the battery 38, conductors 42, 43, solenoid 37, the contacts 41, 36, and ground. With the contact points 41, 36 in contact the solenoid 37 is activated. The activation of the solenoid 37 pulls on the solenoid spring 35 to cause a counterrotation of the shaft 14. This counterrotation breaks the contact between the points 36, 41 and moves the pole holder to the position shown in phantom at 47 in Figure 6. This movement pulls back on the fishing line causing the fish to be hooked. If the fish continues to pull after it has been hooked, contact will again be formed between the points 36, 41 and the solenoid will again be activated to cause a counterrotation of the shaft 14.

As may best be seen in Figure 5, the shaft 13 has a corresponding mechanism to activate it. This mechanism includes a second solenoid 48 and a second pair of contact points indicated at 49. Suitable conductors are also provided to connect the solenoid 48 and the points 49 to the battery 38 and to the ground as indicated at 50.

A suitable manual switch 52 may be provided. The manual switch 52 is connected to the ground at 53. The switch 52 is a two-way switch. The switch is connected through conductor 54 to the solenoid 37. Its connection is in parallel with the contact points 36, 41. The switch is also connected in parallel to contact points 49. This parallel connection is through conductor 55 to the solenoid 48.

Through use of the manual switch 52 the operator may activate either of the solenoids at any time he may choose. Thus, if a small fish is biting on the bait carried by one of the poles 10, for example, the switch arm 56 may be moved against contact 57 to cause a counterrotation of shaft 13 or against contact 58 to cause a counterrotation of shaft 14. Thus, though a fish may not be of a sufficient size to pull against the spring 34 to close the contact points, the operator may activate the solenoid by closing the switch. This construction permits one fisherman to operate as many poles as he may choose. He may thus simply fish by "pushbutton" to hook fish on any of a plurality of fishing poles.

Under certain conditions, such as with rough water, considerable pull is exerted against the fishing line even when there are no fish on the line. To provide a dependable mechanism which will not be unduly affected by such rough conditions, adjusting screws 60, 61 are provided. An internally threaded, non-rotating nut 62 is threaded onto the adjusting screw 61. As the adjusting screw 61 is rotated, the nut 62 shifts axially along the screw in one direction or the other. The nut 62 is connected to the spring 34. The movement of the nut 62 thus selectively increases or decreases the tension on the spring 34 and in turn the spring 35. Thus the sensitivity of the entire mechanism may be altered by adjusting the screw 61. The adjusting screw 60 performs a comparable function with the mechanism which activates the pole support 11.

A device has thus been described in which a combination of a fishing tackle box and a fishing pole supporting device is provided. The combination described also includes a mechanism to activate a fishing pole in response to the pull of a fish. This mechanism as described provides a supplemental source of energy to activate the fishing pole supporting device and to pull the pole back with greater force that it is pulled out by the fish. A device has also been described which provides the combination of a fishing tackle box which carries movable fishing pole supporting devices which will pull back repeatedly on a fishing pole in response to impulse provided by a fish pulling in an outward direction.

Thus, it will appear that an embodiment of the invention has been described which accomplishes the objects set forth hereinabove and many others. Alterations and modifications from the exact structure shown will occur to others upon a reading and understanding of the specification. It is my intention to have such modifications and alterations included as a part of my invention insofar as they come within the scope of the appended claims.

I claim:

1. A fishing pole supporting device, comprising, a frame, a shaft rotatably carried by said frame, a pole support fixed to the shaft to carry a fishing pole, a spring having first and second ends, the first spring end being connected to the shaft, pulling means connected to the frame and to the second spring end, and means carried by the frame to activate the pulling means, whereby to provide a device to support a fishing pole and to hook and play a fish in which pulling movement of the fish causes rotation of the shaft to cause the activation means to activate the pulling means and cause a counterrotation of the shaft, and whereby the spring will cushion the pulling movement of both the fish and the pulling means.

2. A fishing pole supporting device, comprising, a frame, a shaft rotatably carried by the frame, a pole support fixed to the shaft to carry a fishing pole, a spring having first and second ends, the first spring end being connected to the shaft, pulling means connected to the frame and to the second spring end, means carried by the frame to activate the pulling means, and adjustment means to adjust the tension of the spring, whereby to provide a device to support a fishing pole and to hook and play a fish in which pulling movement of the fish causes rotation of the shaft to cause the activation means to activate the pulling means and cause a counterrotation of the shaft, and whereby the spring will cushion the pulling movement of both the fish and the pulling means.

3. A fishing pole supporting device, comprising, a frame, a shaft rotatably carried by the frame, a pole support fixed to the shaft to carry a fishing pole, a solenoid mounted on the frame and connected to the shaft, contact means mounted in the device to close a circuit to activate the solenoid when the shaft is rotated, a source of electric potential; and conductors serially connecting said contact means, said solenoid, and said source of electric potential; whereby to provide a device in which rotation of the shaft in one direction in response to pressure exerted on a supported fishing pole will close the contact means to activate the solenoid and cause a counterrotation.

4. A fishing pole supporting device, comprising, a frame, a bearing, a shaft rotatably carried by the frame, a pole support fixed to the shaft to carry a fishing pole, a solenoid fixed to the frame, a laterally projecting lever carried by the shaft, a first spring connected to the lever and to the frame, a second spring connected to the lever and to the solenoid said first and second springs being opposed springs to hold the device in a neutral position normally, first and second electric contacts, the first electric contact being carried by the shaft and the second contact being carried by the frame, said contacts being carried in spaced relationship, a source of electric potential; and conductors serially connecting the source of electric potential, the contacts, and the solenoid, whereby movement of a supported fishing pole will cause rotation of the shaft against the pull of the second spring to close the contacts to activate the solenoid to cause a counterrotation against the pull of the first spring.

5. A fishing pole supporting device, comprising, a frame, a shaft rotatably carried by the frame, a pole support fixed to the shaft to carry a fishing pole, a solenoid mounted on the frame and connected to the shaft, contact means mounted in the device to activate the solenoid when the shaft is rotated, a source of electric potential; conductors serially connecting said contact means, said solenoid and said source of electric potential; a manual switch, and conductors connecting the manual switch in parallel with said contact means and in series with said solenoid and said source of electric potential, whereby to provide a device in which rotation of the shaft in response to pressure exerted on a supported fishing pole will close the contact means to activate the solenoid and cause a counterrotation and in which closing of the manual switch will also activate the solenoid to cause the shaft to rotate in the direction of such counterrotation.

6. A fishing pole supporting device, comprising, a five sided box having spaced end walls, spaced front and back walls, and a bottom wall, said walls being connected together to form said five box sides, a cover hinged to said back wall, a lock having disconnectable parts, one of said parts being fixed to said cover and the other of said parts being fixed to said front wall to provide a closable container, each of said end walls having an aperture therein, first and second bearings carried by said box, first and second shafts journalled in said first and second bearings respectively, each of said shafts having first and second portions, said first shaft projecting through one of said end wall apertures with its first portion on one side of the one end wall and its second portion inside the box and on the other side of the one wall, said second shaft projecting through the other of said end wall apertures with its first portion on one side of said other end wall and its second portion inside the box and on the other side of said other end wall, a pair of fishing pole supports, one of said supports being mounted on the first portion of each of said shafts, first and second solenoids mounted in said box, a first spring connected to said first solenoid and said first shaft second portion, a second spring connected to said second solenoid and said second shaft second portion, a third spring connected to said first shaft second portion and to said box, a fourth spring connected to said second shaft second portion and to said box, a battery carried by said box, a first pair of contacts carried in spaced relationship by said first shaft and said box, a second pair of contacts carried in spaced relationship by said second shaft and said box, conductors serially connecting said first solenoid, said first pair of contacts, and said battery, and conductors serially connecting said second solenoid, said second pair of contacts, and said battery.

References Cited in the file of this patent
UNITED STATES PATENTS
2,740,219     Harden _____ Apr. 3, 1956
FOREIGN PATENTS
509,012     France _____ Oct. 29, 1920